United States Patent
Sonwane et al.

(10) Patent No.: US 9,080,115 B2
(45) Date of Patent: Jul. 14, 2015

(54) FLOW SPLITTER FOR A COMPACT GASIFICATION REACTOR SYSTEM

(75) Inventors: Chandrashekhar Sonwane, Sacramento, CA (US); Kenneth M. Sprouse, Sacramento, CA (US)

(73) Assignee: AEROJET ROCKETDYNE OF DE, INC., Canoga Park, CA (US)

(\*) Notice: Subject to any disclaimer, the term of this patent is extended or adjusted under 35 U.S.C. 154(b) by 0 days.

(21) Appl. No.: 14/116,845

(22) PCT Filed: May 31, 2011

(86) PCT No.: PCT/US2011/038598
§ 371 (c)(1),
(2), (4) Date: Nov. 11, 2013

(87) PCT Pub. No.: WO2012/166117
PCT Pub. Date: Dec. 6, 2012

(65) Prior Publication Data
US 2014/0102001 A1    Apr. 17, 2014

(51) Int. Cl.
C10J 3/68     (2006.01)
C10J 3/72     (2006.01)
F23K 3/02     (2006.01)
C10J 3/50     (2006.01)
F16L 41/02    (2006.01)

(52) U.S. Cl.
CPC .. *C10J 3/72* (2013.01); *C10J 3/506* (2013.01); *F16L 41/02* (2013.01); *F23K 3/02* (2013.01); *C10J 2200/09* (2013.01); *C10J 2200/15* (2013.01)

(58) Field of Classification Search
CPC .................................. C10J 3/72; F16L 41/02
USPC ....................... 48/76, 203; 137/338; 423/220
See application file for complete search history.

(56) References Cited

U.S. PATENT DOCUMENTS

| 4,469,050 A | * | 9/1984 | Korenberg .................... 122/4 D |
| 5,028,241 A | * | 7/1991 | Kooiman et al. ................. 48/87 |
| 6,109,911 A | * | 8/2000 | Tamminen et al. ............... 431/4 |
| 7,547,423 B2 | * | 6/2009 | Sprouse et al. ............... 422/198 |
| 2005/0281722 A1 | | 12/2005 | Sprouse | |
| 2011/0036011 A1 | | 2/2011 | Sprouse | |

FOREIGN PATENT DOCUMENTS

| EP | 0068115 | 1/1983 |
| EP | 1717295 | 11/2006 |
| GB | 000316667 A | * 5/1930 |

OTHER PUBLICATIONS

International Preliminary Report on Patentability for International Application No. PCT/US2011/038598 mailed on Dec. 12, 2013.
(Continued)

*Primary Examiner* — Craig Schneider
*Assistant Examiner* — Angelisa L Hicks
(74) *Attorney, Agent, or Firm* — Joel G Landau

(57) ABSTRACT

A flow splitter is operable to divide flow of a fuel mixture. The flow splitter includes a first tube having an outlet end and a plurality of second tubes that are coupled at the outlet end to divide flow from the first tube. Each of the plurality of second tubes has a respective inside diameter that satisfies Equation (I) and Equation (II) disclosed herein.

16 Claims, 2 Drawing Sheets

(56) References Cited

OTHER PUBLICATIONS

Sprouse, K. (2006). Dry coal feed system and multi-element injector test plan—task 2. Injector and feed system development and test. Department of Energy Topical Report, Office of Scientiifc and Tehcnical Information. Aug. 30, 2006.

International Search Report for PCT Application No. PCT/US2011/038598 completed Dec. 15, 2011.

* cited by examiner

FLOW SPLITTER FOR A COMPACT GASIFICATION REACTOR SYSTEM

BACKGROUND

This disclosure relates to flow splitters, such as those used in gasification reactor systems to divide flow of a fuel mixture.

Fuel, such as pulverized coal, is known and used in the production of synthesis gas or syn-gas (e.g., a mixture of hydrogen and carbon monoxide) in gasification systems. In conventional gasification systems, the fuel is fed through a feed line into a reactor vessel. In the reactor vessel, the fuel mixes and reacts with oxidant to produce the synthesis gas as a reaction product.

A high velocity injector of a gasification system typically includes a plurality of passages through which the fuel and oxidant are injected. In a pentad injector, the fuel is fed through a central passage and the oxidant is fed through four impinging passages such that the oxidant streams impinge upon the fuel stream on the reaction side of the injector.

In a system that utilizes coal, prior to introduction into the gasification system, the coal is pulverized into a carbonaceous particulate material. The particulate material is then entrained in a carrier gas and fed into the high pressure environment of the gasification system. Unlike a liquid fuel that behaves as Newtonian fluid, an ultra-dense phase, pulverized coal stream behaves as a Bingham plastic (at void fractions below 57%), which will plug in the gasification system if the shear stress on the coal falls below its Bingham fluid yield stress. To avoid plugging, the void fraction of the coal in the gasification system is maintained above the 57%. Void fractions above 57% cause non-uniformities in the flow of the coal and poor mixing with the oxidant in the reactor vessel, which prevents the use of high void fraction coal with high velocity, multi-element injectors.

DETAILED DESCRIPTION

Figure 1:
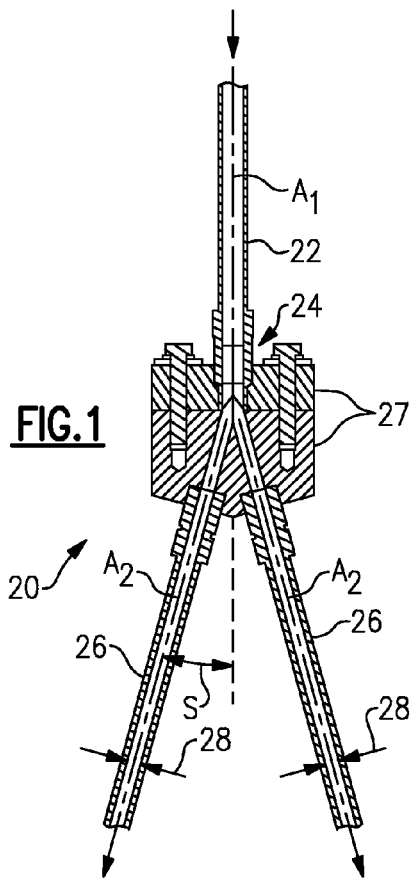
FIG. 1 shows a cross-sectional view of an example flow splitter.

FIG. 1 shows a cross-section of an example flow splitter 20 for dividing flow (e.g., dividing the flow rate) of a fuel mixture.

In one example, the fuel mixture is a dual-phase fuel mixture that includes a fuel material, such as a carbonaceous particulate material (e.g., pulverized coal), entrained in a carrier gas (e.g., nitrogen, carbon dioxide, etc.). In a further example, the carbonaceous particulate material is ultra-dense phase pulverized coal material that behaves as a Bingham plastic (at void fractions below 57%) in the flow splitter 20. In a further example, the pulverized coal material is dry (less than 18 wt % moisture) and nominally has 70 wt % of the particles that pass through a 200 mesh (74 micrometer) screen. As will be described, the flow splitter 20 includes features for uniformly dividing flow of the fuel mixture. It is to be understood that the examples disclosed herein are not limited to coal and may be used with other types of fuels, such as, but not limited to, petcoke and biomass.

In the illustrated example, the flow splitter 20 includes a first tube 22 that has an outlet end 24 and a plurality of second tubes 26. As shown, the flow splitter 20 has two of the second tubes 26, although it may have more than two in other examples that are not shown and is not limited to any particular number. The second tubes 26 are coupled at the outlet end 24 of the first tube 22 to divide flow from the first tube 22.

The first tube 22 and the second tubes 26 are generally elongated, cylindrical tubes. The first tube 22 extends along a central axis $A_1$, and the second tubes 26 extend along respective central axes $A_2$. The flow splitter 20 defines a split angle (S) with regard to the angle between the axis $A_1$ and axes $A_2$. In one example, the split angle (S) is within a range of 5°-25°. In a further example, the split angle (S) is 10°.

As shown, the first tube 22 and the second tubes 26 are secured together using fasteners and a bracket 27. It is to be understood, however, that the flow splitter 20 is not limited to the illustrated arrangement and, given this description, one of ordinary skill in the art will recognize other mechanisms for securing the first tube 22 and the second tubes 26 together to meet their particular needs.

Each of the plurality of second tubes 26 has, independently of the others, an inside diameter $D_t$, represented at 28. The inside diameters $D_t$ satisfy Equation (I) and Equation (II):

$$\frac{\rho_s \varepsilon (1-\varepsilon) D_p^2 P_g \sin\phi_w}{D_t \mu_g \sqrt{150}} \leq 8{,}000 \ \frac{lbm}{ft^2 \cdot s} \quad \text{Eq. (I)}$$

$$\frac{\eta D_p^2 P_g \varepsilon \sin\phi_w}{\mu_g D_t^2 \tau_y \sqrt{150}} \leq 2.5 \quad \text{Eq. (II)}$$

where, $\rho_s$ is the true solids density inherent in the fuel material (e.g., coal) material in the fuel mixture, $\eta$ is the Bingham coefficient of rigidity inherent in the fuel material in the fuel mixture, $\tau_y$ is the Bingham yield stress inherent in the fuel material in the fuel mixture, $D_p$ is the average particle diameter of the fuel material in the fuel mixture, $\mu_g$ is the viscosity of a carrier gas in the fuel mixture, $P_g$ is the gas pressure of the carrier gas in the fuel mixture, $\varepsilon$ is a predetermined void volume fraction of the fuel material in the fuel mixture, and $\Phi_w$ is a wall friction angle between the flow direction of the fuel material and the axes $A_2$ of the second tubes 26. In some examples, $D_p$ is the Sauter mean, $D_{32}$, or the volume diameter mean, $D_{31}$.

In one embodiment, the inside diameters $D_t$ of the second tubes 26 are equivalent to each other.

In another embodiment, the inside diameters $D_t$ of the second tubes 26 satisfy Equation (I) and Equation (II).

The size of the inside diameters $D_t$ of the second tubes 26 which satisfies at least one of Equation (I) or Equation (II) allows the flow splitter 20, and gasification system in which the flow splitter 20 is used, to operate in a hydrodynamic regime that was previously unavailable for fuel mixtures, such as carbonaceous particulate material fuel mixtures. As an example, establishing the size of the inside diameters $D_t$ to satisfy Equation (I) permits uniform splitting of the fuel mixture through the flow splitter 20, without plugging, at mass fluxes that are lower than previously known. In another example, establishing the size of the inside diameters $D_t$ to satisfy Equation (II) permits uniform splitting of the fuel mixture through the flow splitter 20, without plugging, at Bingham-Sprouse numbers that are lower than previously known. The term "establishing" or variations thereof refers to the selection of the inside diameters $D_t$ of the flow splitter 20 such that the inside diameters $D_t$ satisfy Equation (I) and Equation (II), to the designing of the inside diameters $D_t$ of the flow splitter 20 such that the inside diameters $D_t$ satisfy Equation (I) and Equation (II), to the making of the flow splitter 20 with inside diameters $D_t$ such that the inside diameters $D_t$ satisfy Equation (I) and Equation (II), and/or to the implementation or use of the flow splitter 20 with inside diameters $D_t$ in a gasification reactor system such that the inside diameters $D_t$ satisfy Equation (I) and Equation (II).

In the illustrated example, establishing the size of the inside diameters $D_t$ in satisfaction of Equation (I) and Equation (II) also allows the use of a lower predetermined velocity $v_s$ through the flow splitter 20, while maintaining uniform flow splitting and avoiding plugging. In comparison, at the same velocity the fuel material would either plug or not flow smoothly through a flow splitter that does not meet Equation (I) and Equation (II). Using a lower predetermined velocity $v_s$ through the flow splitter 20 reduces wear on the flow splitter 20 and other components in the gasifier system.

In a further example, meeting Equation (I) and Equation (II) also provides the ability to vary the values of one or more of the given variables within the equations in order to meet or comply with certain design factors, but still ensure uniform dividing of the fuel mixture in the flow splitter 20. For instance, a user need not be limited to a particular average particle diameter of the fuel material in the fuel mixture, particular viscosity of a carrier gas in the fuel mixture, particular predetermined velocity of the fuel material in the first tube 22, particular gas pressure of the carrier gas in the fuel mixture, particular predetermined void volume fraction of the fuel material in the fuel mixture, or particular friction angle. In other words, a designer or user of a gasification reactor system has greater ability to vary the values of the given variables to be within a range that will satisfy Equation (I) and Equation (II) to ensure uniform flow splitting.

In a further example, the sum of the inside diameters $D_t$ is also greater than the inside diameter of the first tube 22, and the inside diameters $D_t$ are individually less than the inside diameter of the first tube 22. In another example, the sum of the cross-sectional areas of the second tubes 26 is approximately equal to the cross-sectional area of the first tube 22.

Figure 2:
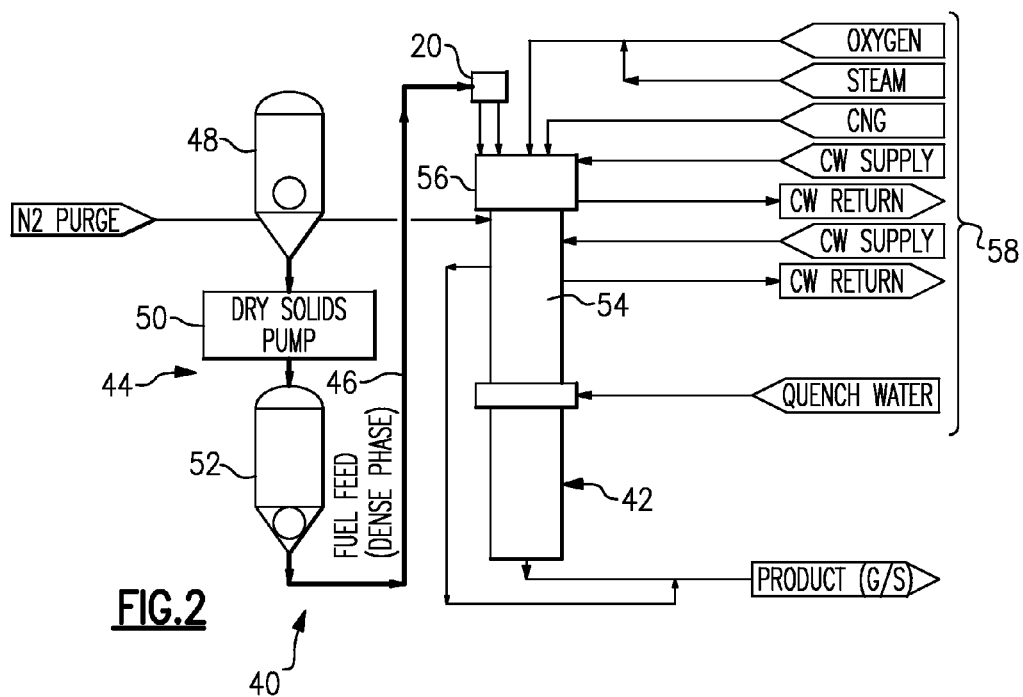
FIG. 2 schematically shows an example gasification reactor system that incorporates a flow splitter.

FIG. 2 illustrates an example gasification reactor system 40 that utilizes the flow splitter 20 (shown schematically). It is to be understood that the gasification reactor system 40 includes a variety of components that are shown in the illustrated example but that this disclosure is not limited to particular arrangement shown. Other gasification reactor systems will also benefit from the examples disclosed herein.

In the illustrated example, the gasification reactor system 40 generally includes a reactor vessel 42, a fuel source 44, and a feed line 46 that fluidly connects the fuel source 44 and the reactor vessel 42.

The fuel source 44 includes a fuel lock hopper 48 that is generally operated at atmospheric pressure to provide the fuel mixture including the carbonaceous particulate material to a dry solids pump 50. As an example, the fuel lock hopper 48 includes a storage silo and may be sized for the capacity of the gasification reactor system 40.

The dry solids pump 50 is an extrusion pump for moving the fuel mixture from the atmospheric pressure environment of the fuel lock hopper 48 to the high pressure environment (e.g., 1200 psia/8.3 MPa or greater) of the remaining portion of the gasification reactor system 40. Alternatively, the dry solids pump 50 is a belt pump or other suitable pump for moving the fuel mixture from the atmospheric pressure environment into the head of the high pressure environment of the remaining portion of the gasification reactor system 40.

The dry solids pump 50 feeds the fuel mixture to a fuel feed hopper 52. The fuel mixture is then fed from the fuel feed hopper 52 into the feed line 46. The carrier gas is introduced and regulated at the fuel feed hopper 52 in a known manner.

Although not shown, the fuel source 44 and feed line 46 also include sensors that are operable to provide signals from which the values of one or more of the given variables within Equation (I) and Equation (II) is calculated. For instance, the fuel feed hopper 52 and feed line 46 include one or more load cells, static pressure transducers, gas flow meters, delta pressure transducers and velocity meters for calculating the velocity of the fuel material, gas pressure of the carrier gas, and void volume fraction of the fuel material in the fuel mixture. The viscosity of the carrier gas is a function of at least temperature and pressure and can be found in known reference values or determined in a known manner.

The feed line 46 connects to the reactor vessel 42. The reactor vessel 42 includes a gasifier chamber 54 for containing the reaction of the fuel material and oxidant. In general, the gasifier chamber 54 is a cylindrical chamber of known architecture for gasification reactions.

The reactor vessel 42 includes an injector 56 at the top of the gasifier chamber 54. In one embodiment, the injector 56 includes a plurality of orifices (not shown) through which the fuel mixture, oxygen and steam are injected for mixing in the gasifier chamber 54. For example, the fuel mixture is fed through a passage in a central orifice and a mixture of the steam/oxygen is fed through passages in impinging orifices such that the emitted steam/oxygen streams impinge upon the fuel mixture stream on the reaction side of the injector 56 in the gasifier chamber 54. In one embodiment, the injector 56 is a pentad injector that includes a central orifice for the fuel mixture and four impinging orifices that surround the central orifice.

In the illustrated example, the gasification reactor system 40 also includes a variety of support systems 58 for supplying the steam/oxygen reactants, cooling the injector 56, cooling the gasifier chamber 54 and/or quenching the reaction products in a known manner.

As shown, the flow splitter 20 is installed in the feed line 46 between the fuel source 44 and the reactor vessel 42. The reactor vessel 42 and its injector 56 are therefore in flow-receiving communication with the flow splitter 20.

In the illustrated example, the flow splitter 20 receives a single input flow into the first tube 22 (FIG. 1) from the feed line 46. The flow splitter 20 divides the flow from the feed line 46 into two streams (or more if there is a greater number of the second tubes 26) that are discharged through the second tubes 26 into the injector 56. In one example, each of the divided streams is fed into an injector element of a multi-element injector design. In other examples, one of the second tubes 26 is connected to another reactor vessel (not shown). In other words, the second tubes 26 need not be connected to a common injector or common reactor vessel. In other examples, the flow splitter 20 includes more than two of the second tubes 26, all of which are connected to a common injector 56. Alternatively, one or more of the second tubes 26 is connected to another injector of another reactor vessel.

In the illustrated example, the uniform division of the flow improves the performance of the gasification reactor system 40. The flow splitter 20 uniformly divides flow of the fuel mixture such that the divided streams go to different locations in the injector 56. The injection of the uniformly divided streams into the gasifier chamber 54 facilitates the achievement of "plug flow" through the reactor vessel. The term "plug flow" refers to the continual axial (downward in the illustration) movement of the reactants and reactant products in the reactor vessel 42, rather than a flow that includes a portion of swirling back flow of the reactants and reactant products towards the injector 56 upon injection into the gasifier chamber 54. The plug flow facilitates forward mixing of the reactants, higher reaction conversion and lower heat flux through the face of the injector 56. In some examples, the plug flow results in an increase in cold gas efficiency for a given residency time and conversion rate of more than 99%. For example, the cold gas efficiency may be 80-85%. In further examples, the cold gas efficiency is 90%, 92% or 95%. In some examples, the plug flow may increase the efficiency of the system and thereby lower the system cost by about 50%. Additionally, the high-pressure, high density syn-gas that is produced requires smaller volumes in downstream units. In some examples, the size of the reactor vessel 42 may be reduced by 90%, which facilitates retrofitting into existing gasifier systems.

Alternatively, the flow splitter 20 uniformly divides the flow such that the divided flow is provided to different reactor vessels within the gasification reactor system. The uniform division of the flow allows the different reactor vessels to operate under substantially identical operating parameters.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

Figure 3:
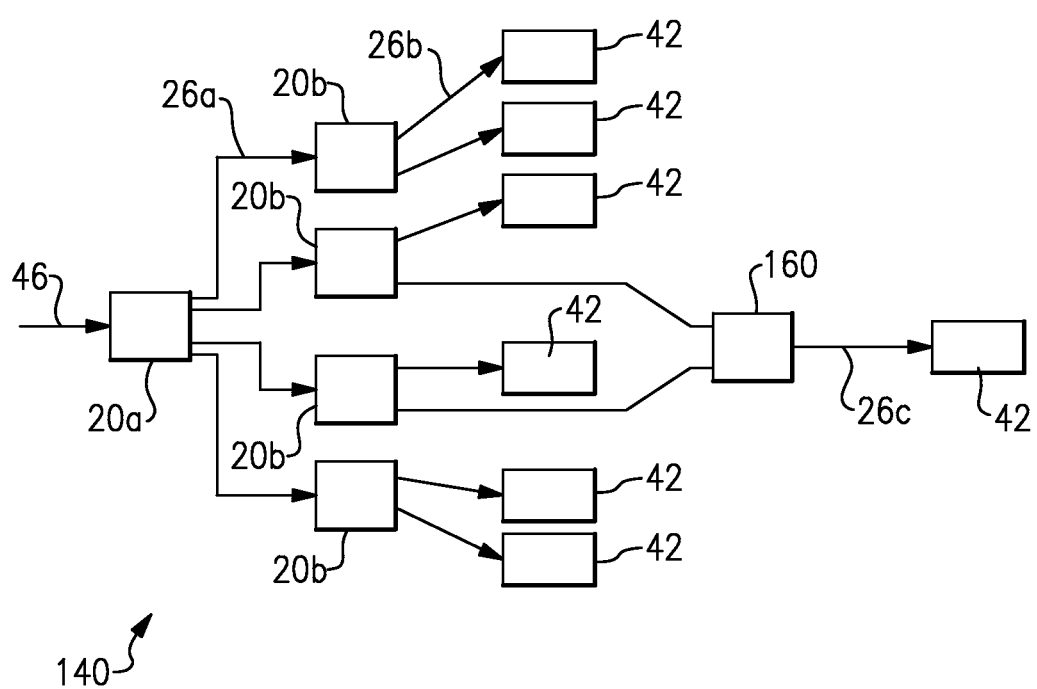
FIG. 3 shows an example gasification system with multi-stage flow splitting.

FIG. 3 shows another example gasification reactor system 140 that utilizes multi-stage flow splitting, where like reference numerals are used to indicate like elements. In this example, the system 140 includes a flow splitter 20a that equally divides flow of the fuel mixture from feed line 46 into $N_1$ different second tubes 26a. The second tubes 26a are received into respective flow splitters 20b that each equally divides the flow into $N_2$ different second tubes 26b. As shown, two of the second tubes 26b are combined downstream at flow combiner 160 into another tube 26c. The second tubes 26b and combined tube 26c are received into respective reactor vessels 42. It is to be understood that the gasification reactor system 140 is not limited to the split ratios represented by the numbers of second tubes 26a and second tubes 26b.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A flow splitter for dividing flow of a fuel mixture, the flow splitter comprising:

a first tube having an outlet end; and a plurality of second tubes that each have a respective inside diameter ($D_t$) and are coupled at the outlet end to divide flow from the first tube, wherein the inside diameters $D_t$ of the plurality of second tubes satisfy Equation (I) and Equation (II):

$$\frac{\rho_s \varepsilon (1-\varepsilon) D_p^2 P_g \sin\phi_w}{D_t \mu_g \sqrt{150}} \leq 8{,}000 \; \frac{lbm}{ft^2 \cdot s} \quad \text{Eq. (I)}$$

$$\frac{\eta D_p^2 P_g \varepsilon \sin\phi_w}{\mu_g D_t^2 \tau_y \sqrt{150}} \leq 2.5 \quad \text{Eq. (II)}$$

where, $\rho_s$ is the true solids density inherent in a fuel material in the fuel mixture;

$\eta$ is the Bingham coefficient of rigidity inherent in the fuel material in the fuel mixture;

$\tau_y$ is the Bingham yield stress inherent in the fuel material in the fuel mixture;

$D_p$ is the average particle diameter of the fuel material in the fuel mixture;

$\mu_g$ is the viscosity of a carrier gas in the fuel mixture;

$P_g$ is the gas pressure of the carrier gas in the fuel mixture;

$\varepsilon$ is a predetermined void volume fraction of the fuel material in the fuel mixture; and $\phi_w$ is a wall friction angle between the flow direction of the fuel material and the axes of the plurality of second tubes.

2. The flow splitter as recited in claim 1, wherein the plurality of second tubes consists of two of the second tubes.

3. A gasification reactor system including a flow splitter that is operable to divide flow of a fuel mixture, the flow splitter including a first tube having an outlet end and a plurality of second tubes that each have a respective inside diameter ($D_t$) and are coupled at the outlet end to divide flow from the first tube, wherein the inside diameters $D_t$ of the plurality of second tubes satisfy Equation (I) and Equation (II):

$$\frac{\rho_s \varepsilon (1-\varepsilon) D_p^2 P_g \sin\phi_w}{D_t \mu_g \sqrt{150}} \leq 8{,}000 \; \frac{lbm}{ft^2 \cdot s} \quad \text{Eq. (I)}$$

$$\frac{\eta D_p^2 P_g \varepsilon \sin\phi_w}{\mu_g D_t^2 \tau_y \sqrt{150}} \leq 2.5 \quad \text{Eq. (II)}$$

where, $\rho_s$ is the true solids density inherent in a fuel material in the fuel mixture;

$\eta$ is the Bingham coefficient of rigidity inherent in the fuel material in the fuel mixture;

$\tau_y$ is the Bingham yield stress inherent in the fuel material in the fuel mixture;

$D_p$ is the average particle diameter of the fuel material in the fuel mixture;

$\mu_g$ is the viscosity of a carrier gas in the fuel mixture;

$P_g$ is the gas pressure of the carrier gas in the fuel mixture;

$\varepsilon$ is a predetermined void volume fraction of the fuel material in the fuel mixture; and $\phi_w$ is a wall friction angle between the flow direction of the fuel material and the axes of the plurality of second tubes.

4. The gasification reactor system as recited in claim 3, including a reactor vessel in flow-receiving communication with at least one of the plurality of second tubes of the flow splitter.

5. The gasification reactor system as recited in claim 4, wherein the reactor vessel includes an injector in flow-receiving communication with at least one of the plurality of second tubes.

6. The gasification reactor system as recited in claim 4, wherein the reactor vessel includes a cooling system.

7. The gasification reactor system as recited in claim 3, including a fuel source that is operable to provide the fuel mixture to the flow splitter.

8. The gasification reactor system as recited in claim 7, wherein the fuel source includes a hopper.

9. The gasification reactor system as recited in claim 7, wherein the fuel source includes a pump.

10. The gasification reactor system as recited in claim 3, including a plurality of reactor vessels in flow-receiving communication with respective ones of the plurality of second tubes of the flow splitter.

11. A method of uniformly dividing flow of a fuel mixture through a flow splitter, the method comprising:

in a flow splitter that includes a first tube having an outlet end and a plurality of second tubes that each have a respective inside diameter ($D_t$) and are coupled at the outlet end to divide flow from the first tube, establishing the inside diameters $D_t$ of the plurality of second tubes to satisfy Equation (I) and Equation (II):

$$\frac{\rho_s \varepsilon (1-\varepsilon) D_p^2 P_g \sin\phi_w}{D_t \mu_g \sqrt{150}} \leq 8{,}000 \; \frac{lbm}{ft^2 \cdot s} \quad \text{Eq. (I)}$$

$$\frac{\eta D_p^2 P_g \varepsilon \sin\phi_w}{\mu_g D_t^2 \tau_y \sqrt{150}} \leq 2.5 \quad \text{Eq. (II)}$$

where, $\rho_s$ is the true solids density inherent in a fuel material in the fuel mixture;

$\eta$ is the Bingham coefficient of rigidity inherent in the fuel material in the fuel mixture;

$\tau_y$ is the Bingham yield stress inherent in the fuel material in the fuel mixture;

$D_p$ is the average particle diameter of the fuel material in the fuel mixture;

$\mu_g$ is the viscosity of a carrier gas in the fuel mixture;

$P_g$ is the gas pressure of the carrier gas in the fuel mixture;

$\varepsilon$ is a predetermined void volume fraction of the fuel material in the fuel mixture; and $\phi_w$ is a friction angle between the flow direction of the fuel material and the axes of the plurality of second tubes.

12. The method as recited in claim 11, including establishing a cold gas efficiency of at least 80%.

13. The method as recited in claim 11, including establishing a cold gas efficiency of at least 90%.

14. The method as recited in claim 11, including establishing a cold gas efficiency of at least 92%.

15. The method as recited in claim 11, including establishing a cold gas efficiency of 95%.

16. A method of delivering a fuel mixture, the method including:

equally dividing flow of the fuel mixture between a plurality of reactor vessels using a flow splitter, the flow splitter including a first tube having an outlet end and a plurality of second tubes that each have a respective inside diameter ($D_t$) and are coupled at the outlet end to divide flow from the first tube, wherein the inside diameters $D_t$ of the plurality of second tubes satisfy Equation (I) and Equation (II):

$$\frac{\rho_s \varepsilon (1-\varepsilon) D_p^2 P_g \sin\phi_w}{D_t \mu_g \sqrt{150}} \leq 8{,}000 \; \frac{lbm}{ft^2 \cdot s} \quad \text{Eq. (I)}$$

$$\frac{\eta D_p^2 P_g \varepsilon \sin\phi_w}{\mu_g D_t^2 \tau_y \sqrt{150}} \leq 2.5 \quad \text{Eq. (II)}$$

where, $\rho_s$ is the true solids density inherent in a fuel material in the fuel mixture;

$\eta$ is the Bingham coefficient of rigidity inherent in the fuel material in the fuel mixture;

$\tau_y$ is the Bingham yield stress inherent in the fuel material in the fuel mixture;

$D_p$ is the average particle diameter of the fuel material in the fuel mixture;

$\mu_g$ is the viscosity of a carrier gas in the fuel mixture;

$P_g$ is the gas pressure of the carrier gas in the fuel mixture;

$\varepsilon$ is a predetermined void volume fraction of the fuel material in the fuel mixture; and $\phi_w$ is a wall friction angle between the flow direction of the fuel material and the axes of the plurality of second tubes.

\* \* \* \* \*